United States Patent
Choi et al.

(10) Patent No.: US 11,835,242 B2
(45) Date of Patent: Dec. 5, 2023

(54) HOT WATER SUPPLYING APPARATUS AND METHOD FOR UTILIZING WASTE HEAT OF HOT WATER SUPPLYING APPARATUS

(71) Applicant: KYUNGDONG NAVIEN CO., LTD., Pyeongtaek-si (KR)

(72) Inventors: Hyuk Choi, Seoul (KR); Jung Keom Kim, Seoul (KR); Chang Heoi Hu, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 193 days.

(21) Appl. No.: 16/770,045

(22) PCT Filed: Dec. 4, 2018

(86) PCT No.: PCT/KR2018/015223
§ 371 (c)(1),
(2) Date: Jun. 4, 2020

(87) PCT Pub. No.: WO2019/124821
PCT Pub. Date: Jun. 27, 2019

(65) Prior Publication Data
US 2020/0386418 A1   Dec. 10, 2020

(30) Foreign Application Priority Data
Dec. 21, 2017   (KR) .......................... 10-2017-0177338

(51) Int. Cl.
*F24D 3/08*     (2006.01)
*F24D 17/00*    (2022.01)
(Continued)

(52) U.S. Cl.
CPC ....... *F24D 19/1069* (2013.01); *F24D 17/001* (2013.01); *F24H 9/20* (2013.01);
(Continued)

(58) Field of Classification Search
CPC .............. F24D 19/1063; F24D 17/001; F24D 17/0005; F24D 19/1054; F24D 3/08;
(Continued)

(56) References Cited

U.S. PATENT DOCUMENTS 3,544,005 A * 12/1970 Meier ................... F24D 19/083
237/8 D
4,065,054 A * 12/1977 Meier ....................... F24D 3/08
237/19
(Continued)

FOREIGN PATENT DOCUMENTS

| CN | 102679431 A | 9/2012 |
| CN | 104272030 A | 1/2015 |

(Continued)

OTHER PUBLICATIONS

International Search Report of PCT/KR2018/015223, dated Mar. 7, 2019, English translation.

*Primary Examiner* — Steven S Anderson, II
(74) *Attorney, Agent, or Firm* — STIP Law Group, LLC

(57) ABSTRACT

The purpose of the present invention is to provide a hot water supplying apparatus which enables supply of hot water by utilizing waste heat of a pipe and a boiler as a heat source if there is a small quantity of residual hot water to use therefor, the residual hot water being required when using hot water of an instantaneous boiler, and a method for utilizing waste heat of a hot water supplying apparatus. The hot water supplying apparatus of the present invention for achieving said purpose comprises: a sensible heat exchanger for heating a heating fluid by means of combustion heat from a burner; a hot water supply heat exchanger for generating
(Continued)

hot water by means of a heat exchange between the heating fluid heated by the sensible heat exchanger and direct water, and supplying the hot water to a faucet; and a pump for circulating the heating fluid via a heating fluid flow path which connects the sensible heat exchanger and the hot water supply heat exchanger, wherein the hot water supplying apparatus comprises: a signal reception unit for receiving a final hot water use signal; and a control unit for stopping the operation of the burner on the basis of the signal received by the signal reception unit and controlling the pump to circulate the heating fluid.

8 Claims, 6 Drawing Sheets

(51) Int. Cl.
  *F24H 9/20* (2022.01)
  *F24D 19/10* (2006.01)
  *F24H 15/174* (2022.01)
  *F24H 15/219* (2022.01)
  *F24H 15/269* (2022.01)
  *F24H 15/335* (2022.01)
  *F24H 15/156* (2022.01)
  *F24H 15/36* (2022.01)
  *F24H 1/10* (2022.01)
  *F24H 15/281* (2022.01)

(52) U.S. Cl.
  CPC ......... *F24H 15/156* (2022.01); *F24H 15/174* (2022.01); *F24H 15/219* (2022.01); *F24H 15/269* (2022.01); *F24H 15/335* (2022.01); *F24H 15/36* (2022.01); *F24D 3/08* (2013.01); *F24H 1/107* (2013.01); *F24H 15/281* (2022.01); *Y02B 30/18* (2013.01)

(58) Field of Classification Search
  CPC .. F24D 17/0036; F24D 19/1051; F24H 1/107; Y02B 30/18; E03C 1/057; F16K 21/04
  USPC .......................................... 122/19.1; 700/282
  See application file for complete search history.

(56) References Cited

U.S. PATENT DOCUMENTS

| | | | | | |
|---|---|---|---|---|---|
| 4,106,692 | A | * | 8/1978 | Baier | F24D 3/08 237/63 |
| 7,819,136 | B1 | * | 10/2010 | Eddy | G01F 11/00 137/624.11 |
| 8,944,105 | B2 | * | 2/2015 | Rodenbeck | E03C 1/057 137/801 |
| 2010/0251974 | A1 | * | 10/2010 | Showen | F24D 19/1051 122/14.3 |
| 2010/0326646 | A1 | * | 12/2010 | Kim | F24D 19/1051 165/287 |
| 2011/0000444 | A1 | * | 1/2011 | Min | F24D 3/1008 122/14.1 |
| 2011/0017152 | A1 | * | 1/2011 | Min | F24D 3/08 236/12.15 |
| 2011/0159394 | A1 | * | 6/2011 | Matsumoto | H01M 8/04007 429/440 |
| 2011/0231022 | A1 | * | 9/2011 | McNamara | G05D 7/0617 700/282 |
| 2011/0315091 | A1 | * | 12/2011 | Adachi | F24D 19/1054 122/14.1 |
| 2012/0090341 | A1 | * | 4/2012 | Hatada | F24H 8/00 62/238.7 |
| 2014/0297048 | A1 | * | 10/2014 | Buchheit | H04L 12/282 700/282 |
| 2015/0148971 | A1 | * | 5/2015 | Acker | F04D 15/00 700/282 |
| 2016/0047558 | A1 | * | 2/2016 | Shimada | F24D 3/02 237/63 |
| 2016/0305671 | A1 | * | 10/2016 | Madigan | F24D 19/1063 |
| 2018/0120824 | A1 | * | 5/2018 | Shimada | G05D 23/2754 |

FOREIGN PATENT DOCUMENTS

| | | | | | |
|---|---|---|---|---|---|
| GB | 2498919 | A | * | 8/2013 | ............ E03C 1/0412 |
| JP | 2004347196 | A | | 12/2004 | |
| JP | 2008107262 | A1 | * | 5/2008 | |
| JP | 2008107262 | B2 | * | 8/2008 | |
| JP | 5031322 | B2 | * | 9/2012 | |
| JP | 2015021681 | A | * | 2/2015 | |
| JP | 2016194407 | A | * | 11/2016 | |
| KR | 1020110032748 | A | | 3/2011 | |
| KR | 1020130051713 | A | | 5/2013 | |
| KR | 1020130116445 | A | | 10/2013 | |
| KR | 1020130126299 | A | | 11/2013 | |
| WO | WO-2019124820 | A1 | * | 6/2019 | ............. F24D 19/10 |

* cited by examiner

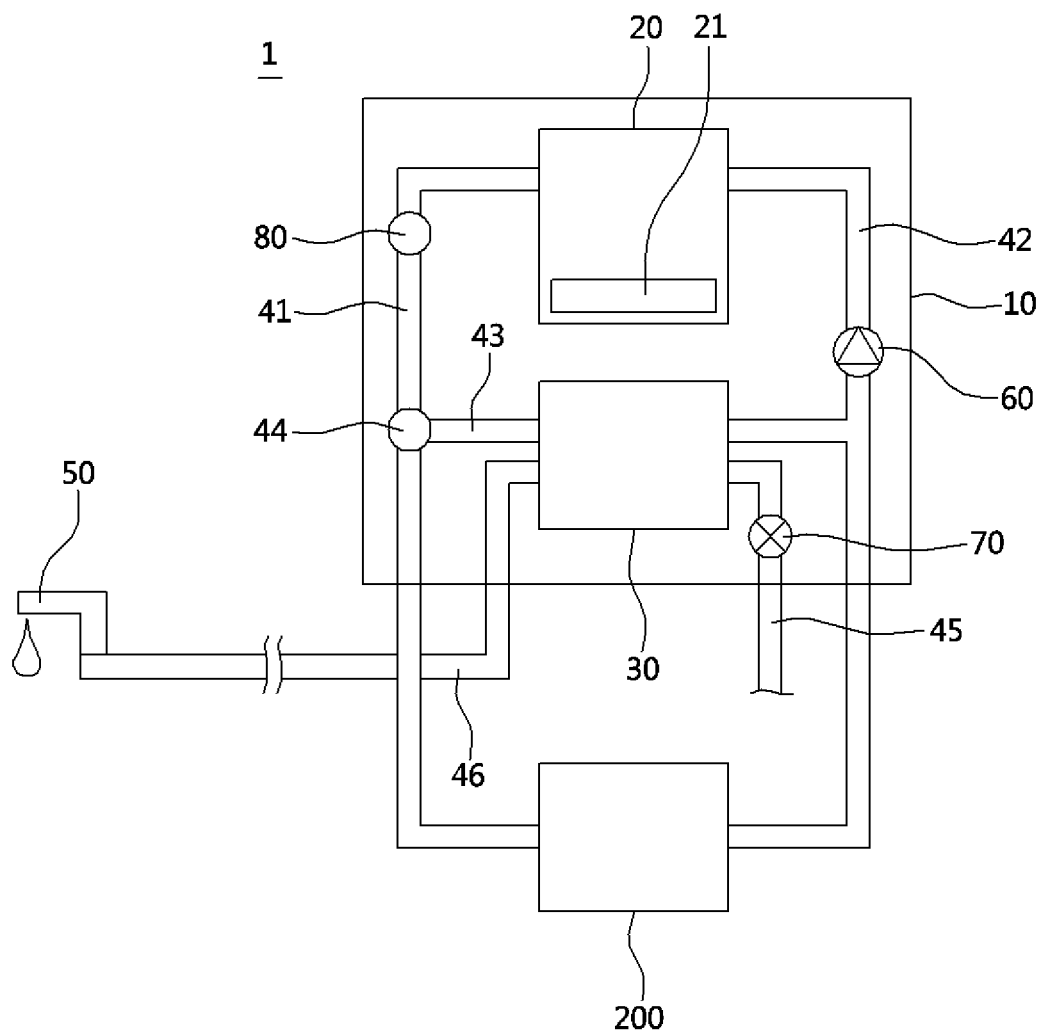
[FIG. 1]

[FIG. 2]
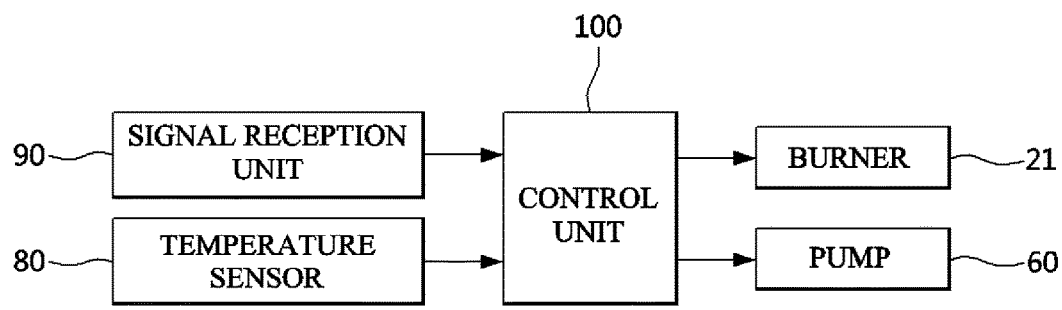

[FIG. 3]
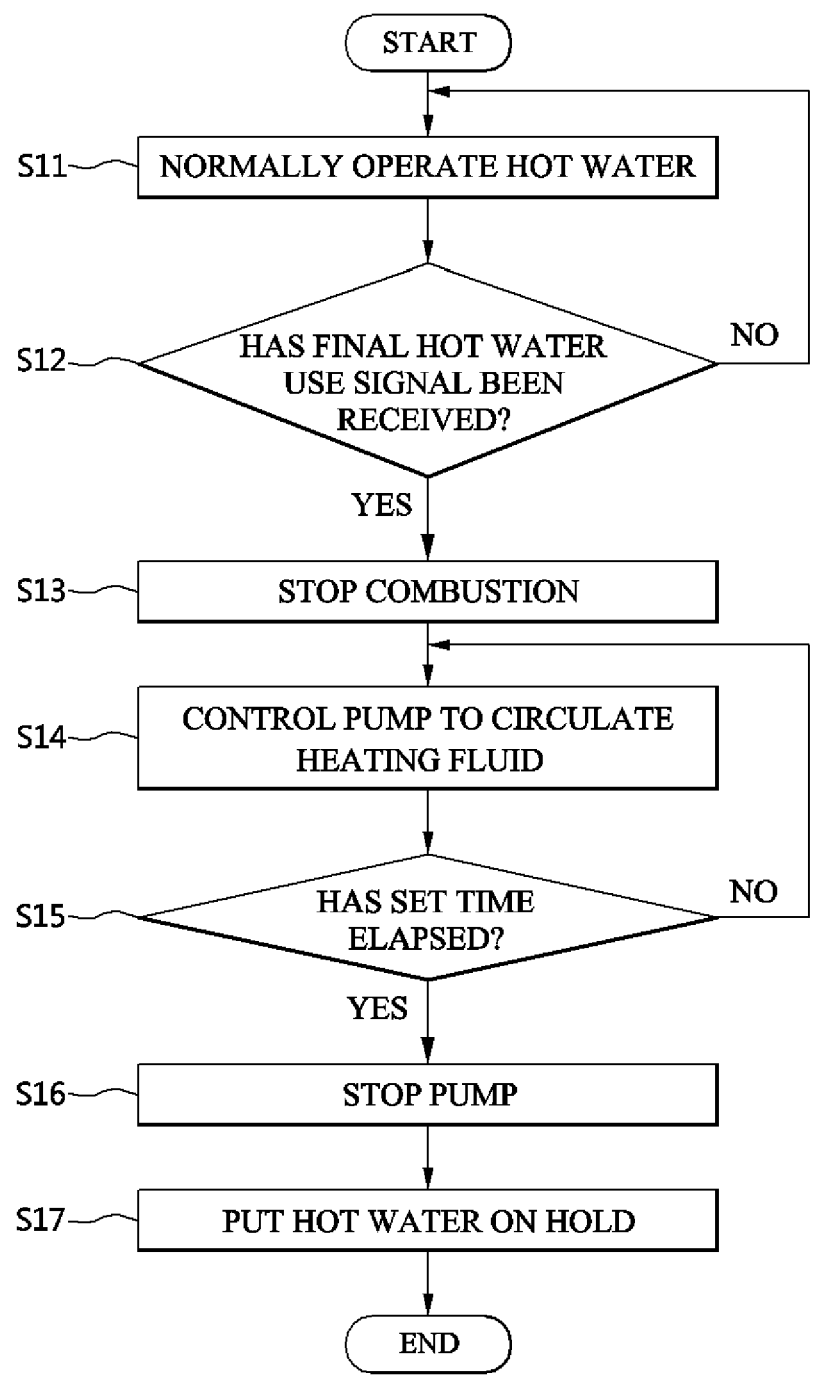

[FIG. 4]
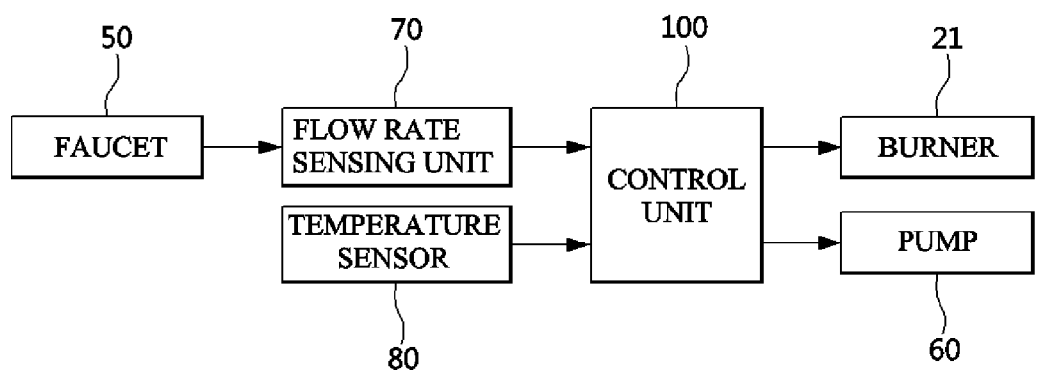

[FIG. 5]
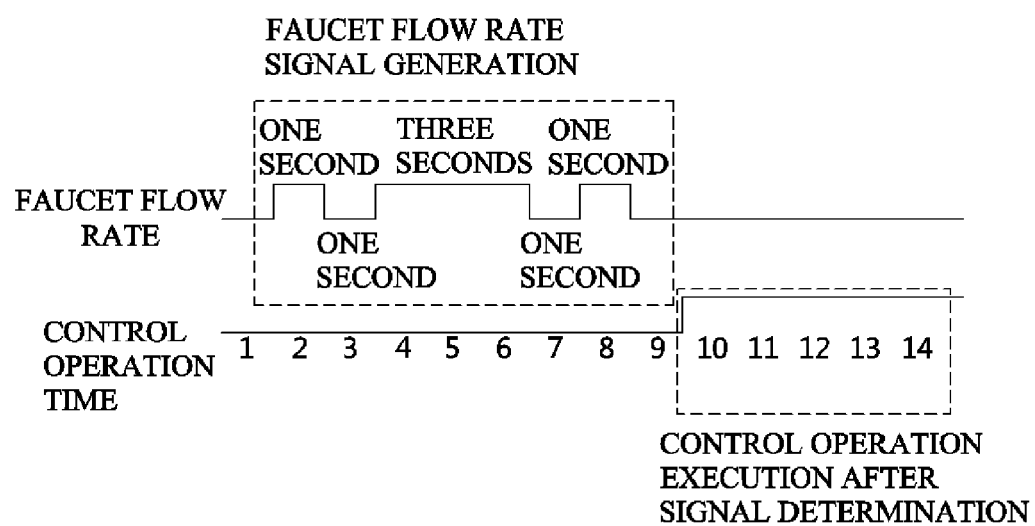

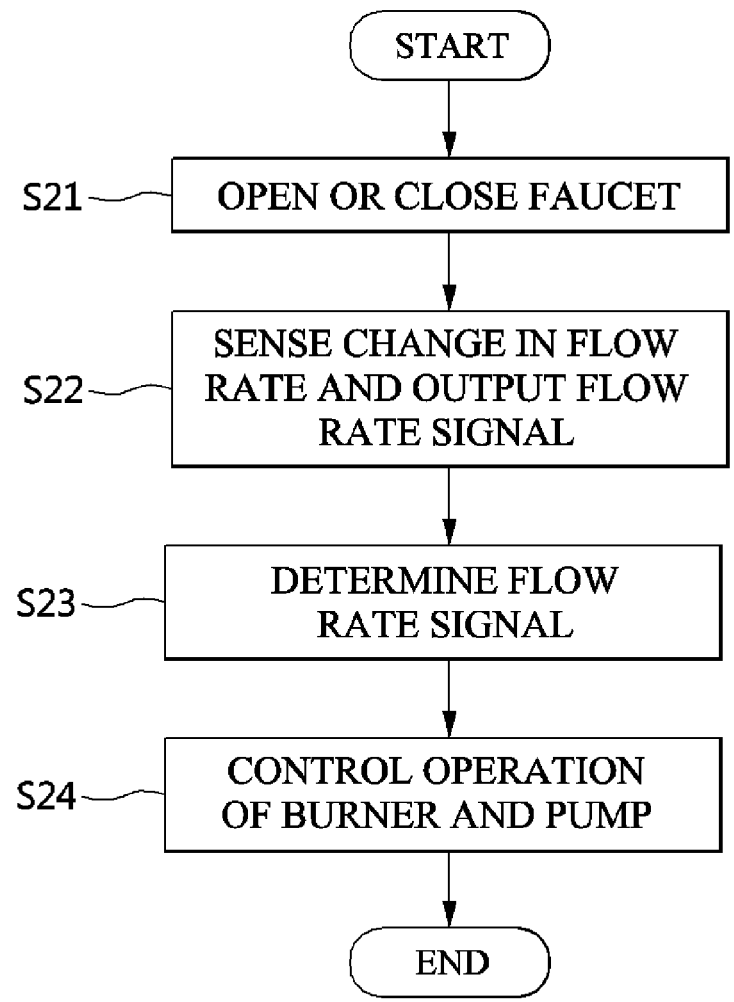
[FIG. 6]

HOT WATER SUPPLYING APPARATUS AND METHOD FOR UTILIZING WASTE HEAT OF HOT WATER SUPPLYING APPARATUS

CROSS-REFERENCE TO RELATED APPLICATIONS

This application is the U.S. National Phase under 35 U.S.C. § 371 of International Application No. PCT/KR2018/015223 filed on Dec. 4, 2018, which in turn claims the benefit of Korean Application No. 10-2017-0177338, filed on Dec. 21, 2017, the disclosures of which are incorporated by reference into the present application.

TECHNICAL FIELD

The present invention relates to a hot water supply apparatus and a method of utilizing waste heat of the hot water supply apparatus, and more specifically, to a hot water supply apparatus, which supplies hot water by utilizing waste heat of a pipe and a boiler as a heat source when an amount of residual hot water required when using hot water of an instantaneous boiler is small, and a method of utilizing waste heat of the hot water supply apparatus.

BACKGROUND ART

Hot water supply apparatuses are apparatuses that heat direct water to a set temperature within a short time so that a user can conveniently use hot water.

Such a hot water supply apparatus is formed to burn fuel, such as oil or gas, through a burner, then heat water using combustion heat generated in the combustion process, and provide the heated water to a user as necessary.

Meanwhile, in the case of a hot water function of an instantaneous boiler being used, when direct water is introduced and a flow rate is sensed, a combustion amount of a burner, which is provided in a heat exchanger in order to supply the direct water after heating the direct water to become hot water at a set temperature, is controlled in accordance with a heat value of the set temperature.

Then, when the user closes a faucet to stop the use of hot water, the boiler stops the operation of the burner and returns to a standby state after performing a purge operation for finishing the combustion operation.

According to such a conventional boiler operating method, when the use of hot water is finished, the hot water remains in a pipe for supplying hot water from the boiler to the faucet and residual heat is present inside the boiler. As described above, the hot water remaining in the pipe for supplying hot water and the residual heat inside the boiler are thermally balanced with an external temperature when the hot water is not used again for a long time, and thus the temperature is lowered, resulting in a waste of heat energy. In addition, in a state in which the use of the hot water is stopped and the operation of the burner is stopped to perform a purge operation, when the user needs a small amount of additional hot water, a combustion operation corresponding to the required amount of heat should be performed again. In this case, there is a problem in that harmful gas is additionally generated due to the ignition of the burner.

As a related art related to a hot water supply apparatus and a control method thereof, a method of controlling a temperature of hot water when a low flow rate of hot water is used in a hot water supply apparatus is disclosed in Korean Patent Registration No. 10-0985381.

DISCLOSURE

Technical Problem

The present invention is directed to providing a hot water supply apparatus, which supplies hot water by utilizing waste heat of a pipe and a boiler as a heat source when an amount of residual hot water required when using hot water of an instantaneous boiler is small, and a method of utilizing waste heat of the hot water supply apparatus.

Technical Solution

One aspect of the present invention provides a hot water supply apparatus including a sensible heat exchanger configured to heat a heating fluid using combustion heat from a burner, a hot water supply heat exchanger which generates hot water using an exchange of heat between the heating fluid heated in the sensible heat exchanger and direct water and supplies the generated hot water to a faucet, and a pump configured to circulate the heating fluid through a flow path of the heating fluid, which connects the sensible heat exchanger to the hot water supply heat exchanger. The hot water supply apparatus includes a signal reception unit configured to receive a final hot water use signal, and a control unit configured to control operation of the burner to be stopped on the basis of the signal received by the signal reception unit and control the pump to circulate the heating fluid.

The control unit may control operation of the pump to be stopped after the pump operates for a set period of time from a time point at which the final hot water use signal is received.

The hot water supply apparatus may further include a temperature sensor configured to sense a temperature of the heating fluid, and the control unit may control operation of the pump to be stopped when the temperature of the heating fluid sensed by the temperature sensor is lower than or equal to a set temperature after the pump operates.

The hot water supply apparatus may further include a flow rate sensing unit configured to sense a change in flow rate of water supplied by opening or closing of the faucet and output a flow rate signal, and the control unit may control operation of the pump to be stopped and control the pump to circulate the heating fluid when the flow rate signal output from the flow rate sensing unit corresponds to the final hot water use signal.

The flow rate sensing unit may sense a period of time for which the faucet is opened or closed and the number of times the faucet is opened or closed and output a flow rate signal having a specific pattern.

Another aspect of the present invention provides a method of utilizing waste heat of a hot water supply apparatus which includes a sensible heat exchanger configured to heat a heating fluid using combustion heat from a burner, a hot water supply heat exchanger configured to generate hot water using an exchange of heat between the heating fluid heated in the sensible heat exchanger and direct water and supply the generated hot water to a faucet, and a pump configured to circulate the heating fluid through a flow path of the heating fluid, which connects the sensible heat exchanger to the hot water supply heat exchanger. The method includes receiving a final hot water use signal, stopping operation of the burner, and controlling the pump to circulate the heating fluid.

The method may further include controlling the pump to be stopped after the pump operates for a set period of time from a time point at which the final hot water use signal is received.

The method may further include sensing a temperature of the heating fluid and controlling the pump to be stopped when the temperature of the heating fluid is lower than or equal to a set temperature after the pump operates.

In the receiving of the final hot water use signal, since the faucet is opened and closed for a set period of time and a set number of times using a pattern which is set as the final hot water use signal, a flow rate signal output by sensing a change in flow rate of supplied water may be used as the final hot water use signal.

Advantageous Effects

According to a hot water supply apparatus and a method of utilizing waste heat of the hot water supply apparatus according to the present invention, in the case in which an amount of residual hot water when using hot water of an instantaneous boiler is small, hot water is generated and supplied by utilizing waste heat of a pipe and a boiler as a heat source. Therefore, it is possible to prevent the waste of energy of hot water remaining in a pipe between a faucet and the boiler and the waste of energy of residual heat remaining in the boiler.

Further, since there is no need to restart a burner in order to additionally use a small amount of hot water, it is possible to reduce fuel consumption and reduce the emission of harmful gases generated when the burner is ignited.

Further, since the faucet is opened and closed at a set period of time and a set number of times using a pattern which is set as the final hot water use signal, a flow rate signal output by sensing a change in flow rate of supplied water is used as the final hot water use signal. Therefore, a control operation for the use of a small amount of hot water can be easily performed without installing a separate apparatus for inputting the final hot water use signal, thereby improving the ease of use of the hot water supply apparatus.

DESCRIPTION OF DRAWINGS

FIG. 1 is a configuration diagram of a hot water supply apparatus of the present invention.

FIG. 2 is a control block diagram of the hot water supply apparatus of the present invention.

FIG. 3 is a flowchart of a method of utilizing waste heat of the hot water supply apparatus of the present invention.

FIG. 4 is a control block diagram of a method of receiving a final hot water use signal according to a faucet flow rate signal.

FIG. 5 is a graph showing an execution time of a control operation according to a faucet flow rate signal according to an embodiment.

FIG. 6 is a flowchart of a method of receiving a final hot water use signal according to a faucet flow rate signal and a method of utilizing waste heat of a hot water supply apparatus according to the method of receiving.

REFERENCE NUMERALS

1: HOT WATER SUPPLY APPARATUS
10: INSTANTANEOUS BOILER
20: SENSIBLE HEAT EXCHANGER
21: BURNER
30: HOT WATER SUPPLY HEAT EXCHANGER
41: HEATING FLUID SUPPLY PIPE
42: HEATING FLUID RETURN PIPE
43: BYPASS PIPE
44: THREE-WAY VALVE
45: DIRECT WATER PIPE
46: HOT WATER PIPE
50: FAUCET
60: PUMP
70: FLOW RATE SENSING UNIT
80: TEMPERATURE SENSOR
90: SIGNAL RECEPTION UNIT
100: CONTROL UNIT
200: HEATING REQUIRING UNIT

MODES OF THE INVENTION

Hereinafter, configurations and operations of exemplary embodiments of the present invention will be described in detail with reference to the accompanying drawings.

Referring to FIG. 1, a hot water supply apparatus 1 according to an embodiment of the present invention includes an instantaneous boiler 10 which heats direct water using a heating fluid to supply hot water, a sensible heat exchanger 20 which heats the heating fluid using combustion heat from a burner 21, and a hot water supply heat exchanger 30 which generates hot water using an exchange of heat between the heating fluid heated in the sensible heat exchanger 20 and the direct water and supplies the hot water to a faucet 50.

The heating fluid heated in the sensible heat exchanger 20 is supplied to a heating requiring unit 200 through a heating fluid supply pipe 41, and the heating fluid passing through the heating requiring unit 200 returns to the sensible heat exchanger 20 through a heating fluid return pipe 42.

A bypass pipe 43 branches from the heating fluid supply pipe 41, and the bypass pipe 43 is connected to the heating fluid return pipe 42 via the hot water supply heat exchanger 30. A three-way valve 44 for selectively connecting a flow path of the heating fluid supplied from the sensible heat exchanger 20 to the heating requiring unit 200 or the hot water supply heat exchanger 30 is provided at a position at which the bypass pipe 43 branches from the heating fluid supply pipe 41.

A direct water pipe 45, through which the direct water is introduced, is connected to one side of the hot water supply heat exchanger 30, and the hot water heated in the hot water supply heat exchanger 30 is supplied to the faucet 50 through a hot water pipe 46. A heat exchange is performed between the heating fluid passing through the hot water supply heat exchanger 30 through the bypass pipe 43 and the direct water introduced into the hot water supply heat exchanger 30 through the direct water pipe 45 so that the direct water is generated as hot water and then is supplied to the faucet 50 through the hot water pipe 46.

A pump 60 used for circulation of the heating fluid is provided in the heating fluid return pipe 42, a flow rate sensing unit 70 which senses a flow rate of the direct water is provided in the direct water pipe 45, and a temperature sensor 80 which senses a temperature of the heating fluid passing through the sensible heat exchanger 20 is provided in the heating fluid supply pipe 41.

Referring to FIG. 2, the hot water supply apparatus 1 of the present invention further includes a signal reception unit 90 which receives a final hot water use signal, and a control unit 100 which stops operation of the burner 21 on the basis of the signal received by the signal reception unit 90 and controls the pump 60 to circulate the heating fluid. Here, the final hot water use signal refers to a signal that a user transmits to a boiler when a small amount of hot water that is additionally needed remains while the user is using the hot water. For example, the final hot water use signal refers to a signal input by the user to receive the hot water by utilizing residual heat remaining in the boiler 10 as a heat source for the direct heating when the user wants to use additional hot water for about one to two minutes while using the hot water.

A unit through which the final hot water use signal is input and the signal is transmitted to the signal reception unit 90 may be formed as an additional input apparatus or may be formed by inputting a specific flow rate pattern according to an opening or closing operation of the faucet 50, which will be described below.

When the final hot water use signal is received, the hot water remaining in the hot water pipe 46 is supplied to the faucet 50 and the operation of the burner 21 is stopped so that sensible heat exchange due to additional combustion in the sensible heat exchanger 20 is not performed. The heating fluid circulates through a closed circuit, in which the heating fluid supply pipe 41, the hot water supply heat exchanger 30, the heating fluid return pipe 42, and the sensible heat exchanger 20 are connected, due to the operation of the pump 60, and thus the residual heat remaining in the sensible heat exchanger 20 is transferred to the direct water passing through the hot water supply heat exchanger 30.

In one embodiment, the control unit 100 may control the pump 60 to be stopped after the pump 60 operates for a set period of time from a time point at which the final hot water use signal is received. The set period of time may be set as a period of time from the time point at which the final hot water use signal is received to a time point at which the residual heat of the sensible heat exchanger 20 is transferred to the hot water supply heat exchanger 30 and exhausted.

In another embodiment, after the final hot water use signal is received and the pump 60 operates, when the temperature of the heating fluid sensed by the temperature sensor 80 is lower than or equal to a set temperature, the control unit 100 may control the operation of the pump 60 to be stopped. Here, the set temperature may be a hot water set temperature or a heating set temperature.

When time elapses from the time point at which the final hot water use signal is received, the temperature of the residual heat inside the boiler 10 including the sensible heat exchanger 20 is lowered. At the time point at which the temperature of the heating fluid is lower than or equal to the set temperature, the residual heat may no longer be used as a heat source for heating the direct water, and thus the operation of the pump 60 is stopped at the time point.

Referring to FIG. 3, in a method of utilizing waste heat of a hot water supply apparatus according to an embodiment of the present invention, while hot water normally operates (S11), when the signal reception unit 90 receives a final hot water use signal by a user's signal input (S12), the combustion of the burner 21 is stopped (S13), and the pump 60 is controlled to circulate a heating fluid (S14). When the period of time, which is set from the time point at which the final hot water use signal is received, elapses (S15), the operation of the pump 60 is stopped (S16), and the hot water is maintained in a standby state (S17).

Referring to FIGS. 4 and 5, a hot water supply apparatus 1 according to another embodiment of the present invention is a unit for inputting a final hot water use signal and transmitting the final hot water use signal to a signal reception unit 90, and a method of inputting a final hot water use signal by an opening or closing operation of a faucet 50 may be applied to the hot water supply apparatus 1.

The hot water supply apparatus 1 according to the present embodiment includes a flow rate sensing unit 70, which senses a change in flow rate of water supplied by opening or closing of the faucet 50 and outputs a flow rate signal, and a control unit 100, which stops operation of a burner 21 and controls a pump 60 to circulate a heating fluid when it is determined that the flow rate signal output from the flow rate sensing unit 70 corresponds to the final hot water use signal.

The flow rate sensing unit 70 may be a flow rate (flow) switch or a flow rate sensor, and the flow rate sensing unit 70 senses a period of time for which the faucet 50 is opened or closed and the number of times the faucet 50 is opened or closed and outputs a flow rate signal having a specific pattern.

When it is determined that the flow rate signal output from the flow rate sensing unit 70 is a preset final hot water use signal, the control unit 100 stops the operation of the burner 21 and controls the pump 60 to circulate the heating fluid, as described above. Therefore, the hot water remaining in the hot water pipe 46 is supplied and the hot water is supplied by utilizing the residual heat inside the instantaneous boiler 10 as a heat source for heating direct water.

When the user who uses the hot water opens or closes the faucet 50, a flow rate of water flowing along the direct water pipe 45 through which the water (the direct water) is supplied and along the hot water pipe 46 is changed, the flow rate sensing unit 70 outputs a faucet flow rate signal having a specific pattern in response to the flow rate change, and the control unit 100 determines whether the final hot water use signal is received based on the output faucet flow rate signal.

In one embodiment, referring to FIG. 5, the final hot water use signal may be configured to open the faucet 50 for one second, close for one second, open for three seconds, close for one second, and open for one second. As described above, the control unit 100 may determine whether the received signal corresponds to the final hot water use signal based on the faucet flow rate signal according to the period of time for which the faucet 50 is opened or closed and the number of times the faucet 50 is opened or closed.

The present embodiment is only one example of the period of time for which the faucet 50 is opened or closed and the number of times the faucet 50 is opened or closed, and it is apparent that the period of time for which the faucet 50 is opened or closed and the number of times the faucet 50 is opened or closed may be changed to be different from the present embodiment. However, in order to be identified as the final hot water use signal, it is preferable that the period of time for which the faucet 50 is opened or closed and the number of times the faucet 50 is opened or closed be set to an opening or closing pattern that is not commonly used when using hot water in everyday life.

As described above, the method of utilizing waste heat of the hot water supply apparatus, to which the method of inputting the final hot water use signal by an opening or closing operation of the faucet 50 is applied, includes opening or closing the faucet 50 at a set period of time and a set number of times (S21), sensing a change in flow rate of direct water due to the opening or closing operation of the faucet 50 and outputting a faucet flow rate signal (S22), determining whether the faucet flow rate signal corresponds to a final hot water use signal (S23), and supplying hot water by utilizing waste heat of the boiler by stopping operation of the burner 21 and by controlling the pump 60 to circulate a heating fluid (S24) when it is determined that the faucet flow rate signal corresponds to the final hot water use signal, as shown in FIG. 6.

As described above, according to the method of utilizing the waste heat of the boiler, in which the final hot water use signal is input by the opening and closing operation of the faucet 50 by the user and whether the received signal is the final hot water use signal is determined, even when a separate apparatus having a signal input function is not installed at a place in which the faucet 50 is located and hot water is used, the final hot water use signal may be input by the opening or closing operation of the faucet 50, thereby improving the ease of use of the hot water.

As described above, the present invention is not limited to the above-described embodiments, and other embodiments that may be changed or modified by those skilled in the art without departing from the scope and spirit of the present invention defined by the appended claims fall within the scope of the present invention.

The invention claimed is:

1. A hot water supply apparatus which includes a sensible heat exchanger configured to heat a heating fluid using combustion heat from a burner, a hot water supply heat exchanger which generates hot water using an exchange of heat between the heating fluid heated in the sensible heat exchanger and direct water and supplies the generated hot water to a faucet, and a pump configured to circulate the heating fluid through a flow path of the heating fluid which connects the sensible heat exchanger to the hot water supply heat exchanger, the hot water supply apparatus configured to receive a final hot water use signal that a user transmits when an additional amount of hot water that is needed remains while the user is using the hot water, the hot water supply apparatus comprising: a controller configured to control operation of the burner to be stopped on the basis of the final hot water use signal and control the pump to circulate the heating fluid, wherein, the hot water supply apparatus further comprises a flow rate sensing unit configured to sense a change in flow rate of water supplied by opening or closing of the faucet and output a flow rate signal, wherein the controller controls operation of the burner to be stopped and controls the pump to circulate the heating fluid when the flow rate signal output from the flow rate sensing unit corresponds to the final hot water use signal.

2. The hot water supply apparatus of claim 1, wherein the controller controls operation of the pump to be stopped after the pump operates for a set period of time from a time point at which the final hot water use signal is received.

3. The hot water supply apparatus of claim 1, further comprising a temperature sensor configured to sense a temperature of the heating fluid, wherein the controller controls operation of the pump to be stopped when the temperature of the heating fluid sensed by the temperature sensor is lower than or equal to a set temperature after the pump operates.

4. The hot water supply apparatus of claim 1, wherein the flow rate sensing unit senses a period of time for which the faucet is opened or closed and the number of times the faucet is opened or closed and outputs a flow rate signal having a specific pattern.

5. A method of utilizing waste heat of a hot water supply apparatus which includes a sensible heat exchanger configured to heat a heating fluid using combustion heat from a burner, a hot water supply heat exchanger configured to generate hot water using an exchange of heat between the heating fluid heated in the sensible heat exchanger and direct water and supply the generated hot water to a faucet, a pump configured to circulate the heating fluid through a flow path of the heating fluid, which connects the sensible heat exchanger to the hot water supply heat exchanger, and a flow rate sensing unit configured to sense a change in flow rate of water supplied by opening or closing of the faucet and output a flow rate signal, the method comprising:

receiving a final hot water use signal that a user transmits when an additional amount of hot water that is needed remains while the user is using the hot water;

stopping operation of the burner; and controlling the pump to circulate the heating fluid, wherein the burner is stopped and the pump circulates the heating fluid when the flow rate signal output corresponds to the final hot water use signal.

6. The method of claim 5, further comprising controlling the pump to be stopped after the pump operates for a set period of time from a time point at which the final hot water use signal is received.

7. The method of claim 5, further comprising:

sensing a temperature of the heating fluid; and controlling the pump to be stopped when the temperature of the heating fluid is lower than or equal to a set temperature after the pump operates.

8. The method of claim 5, wherein, in the receiving of the final hot water use signal, since the faucet is opened and closed for a set period of time and a set number of times using a pattern which is set as the final hot water use signal, a flow rate signal output by sensing a change in flow rate of supplied water is used as the final hot water use signal.

* * * * *